Dec. 2, 1958 W. C. ZIEGLER 2,862,322
DISPLAY FRAME STRUCTURE
Filed Dec. 23, 1954 4 Sheets-Sheet 1
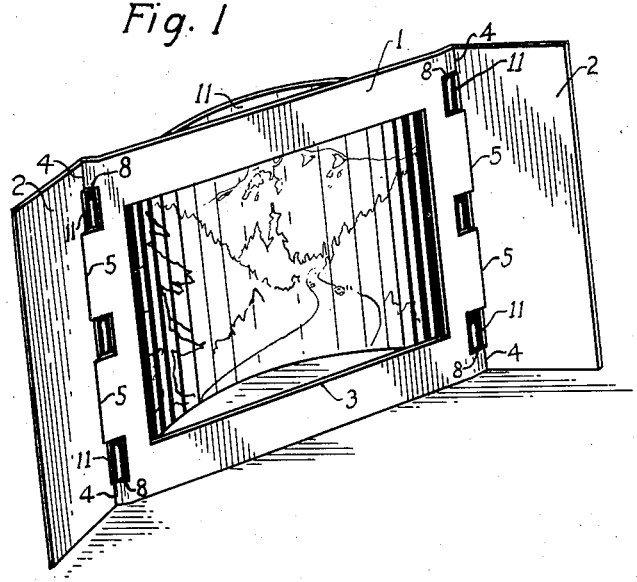
Fig. 1
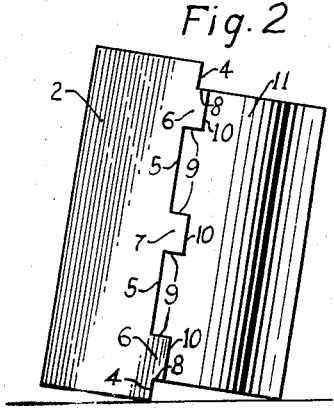
Fig. 2
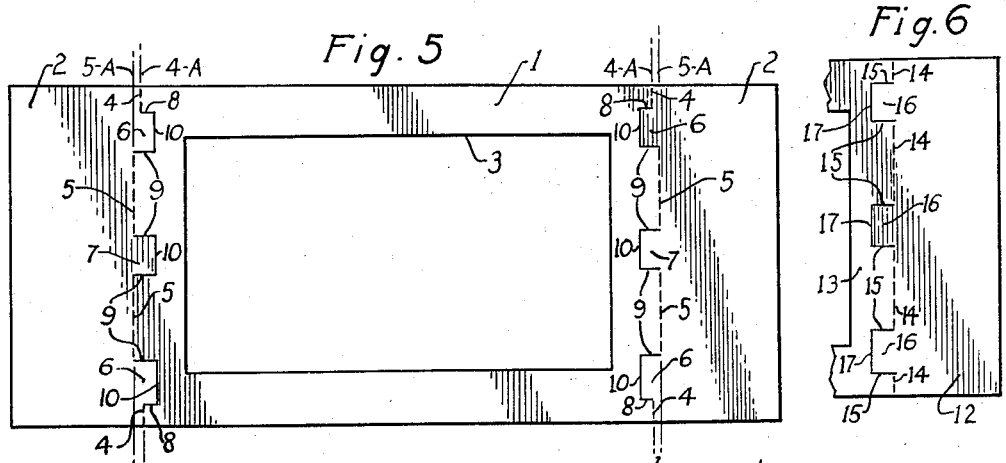
Fig. 3
Fig. 4
Fig. 5
Fig. 6
Inventor:
William Carl Ziegler Dec. 2, 1958 W. C. ZIEGLER 2,862,322
DISPLAY FRAME STRUCTURE
Filed Dec. 23, 1954 4 Sheets-Sheet 2
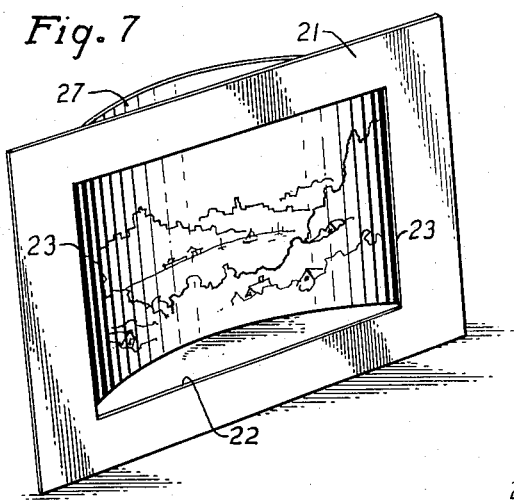
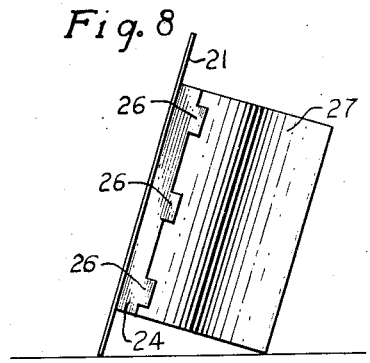
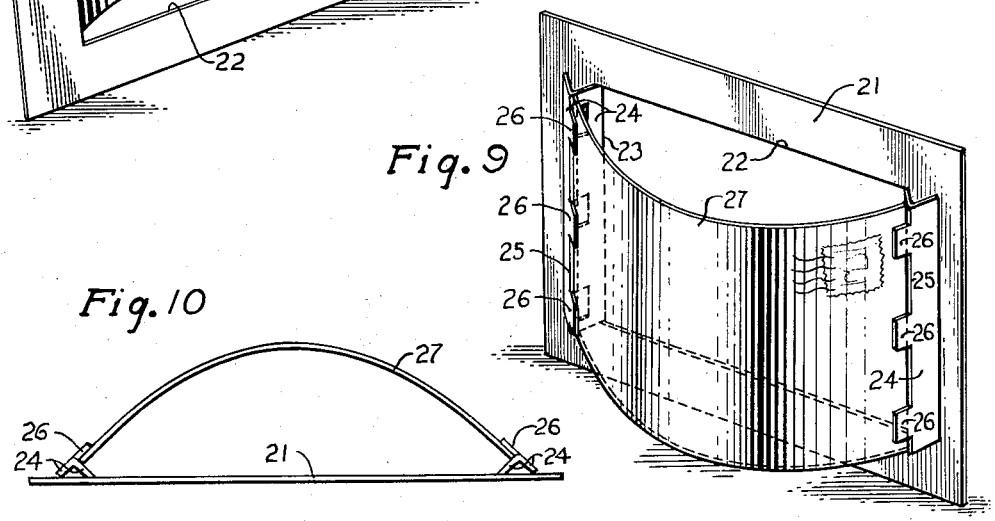
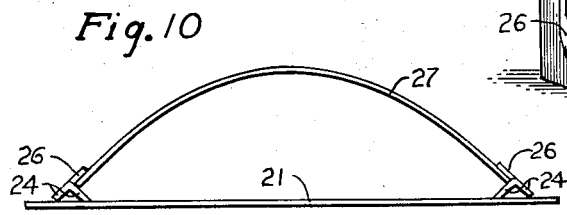
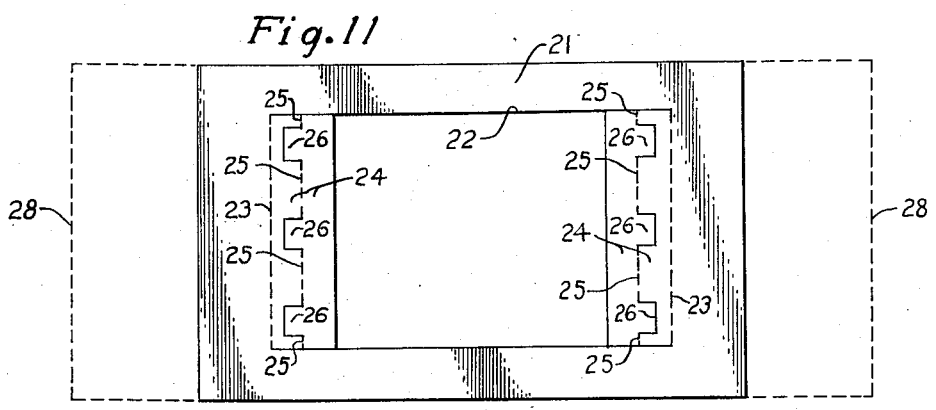
Inventor:
William Carl Ziegler Dec. 2, 1958 — W. C. ZIEGLER — 2,862,322
DISPLAY FRAME STRUCTURE
Filed Dec. 23, 1954 — 4 Sheets-Sheet 3
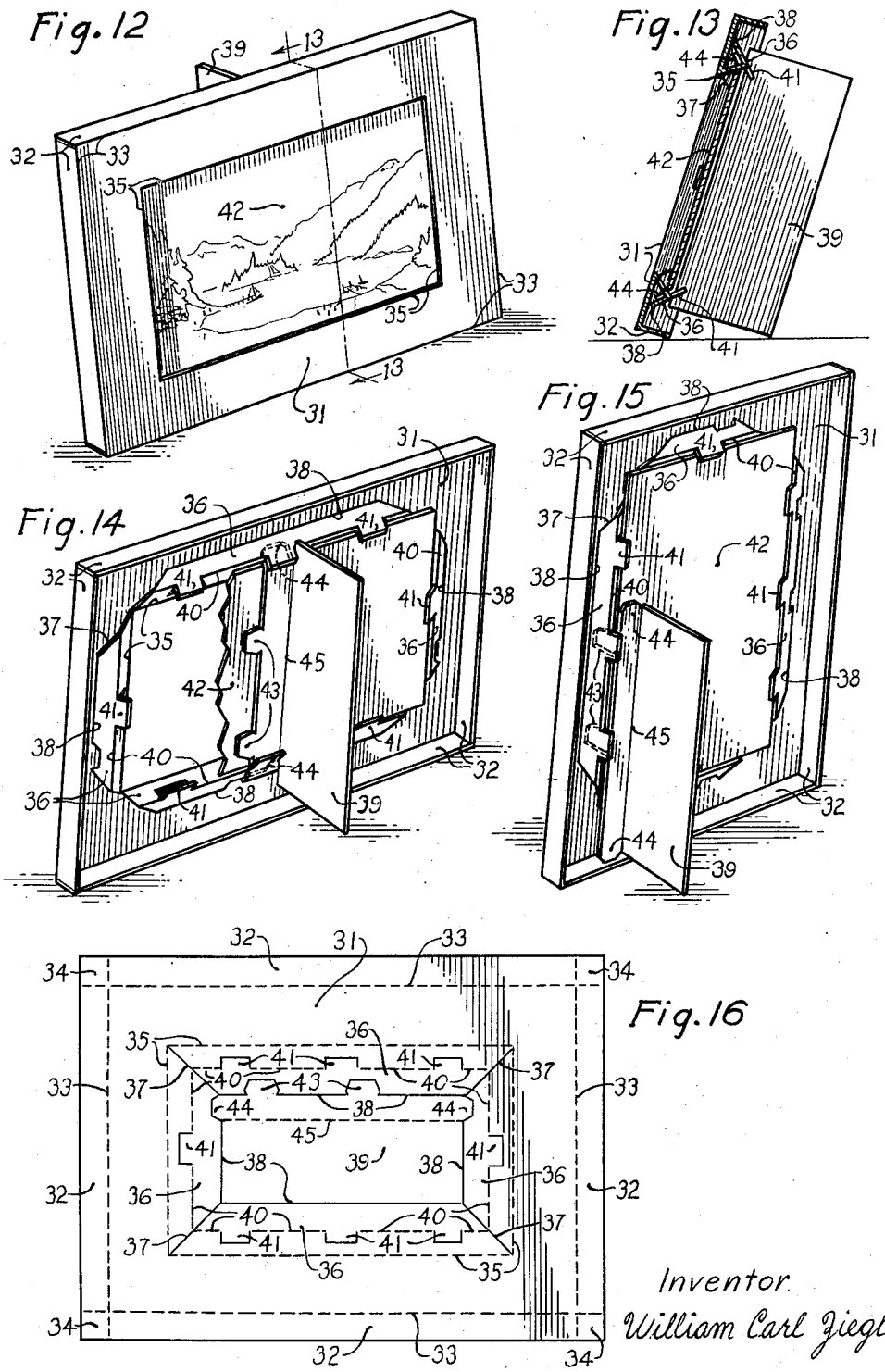
Inventor
William Carl Ziegler

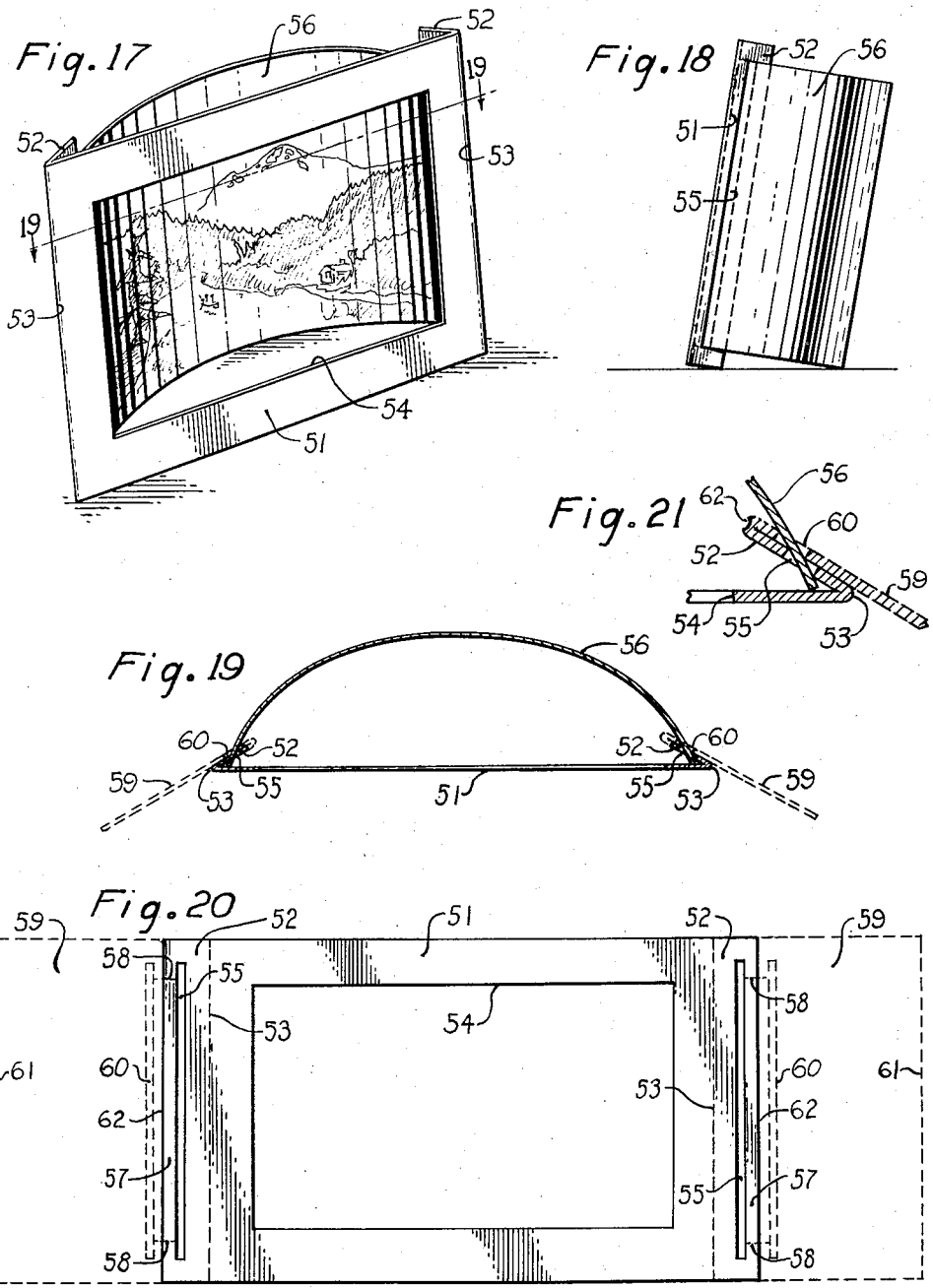

United States Patent Office 2,862,322
Patented Dec. 2, 1958

2,862,322

DISPLAY FRAME STRUCTURE

William C. Ziegler, Northridge, Calif.

Application December 23, 1954, Serial No. 477,379

11 Claims. (Cl. 40—154)

This invention relates in general to display frame structures made of thin sheet material such as cardboard, cut scored and folded, to provide recessed frame structures suitable for displaying picture post cards or other display matter in attractive, practical, and inexpensive holders.

An important object of this invention is to provide recessed frame structures with simple effective means for affixing unaltered picture post cards or other display matter onto the backs of the frame structures so as to be viewed through the opening in the frame in a manner giving added depth to the displays.

A further object of this invention is to form each type of frame structure from a one piece blank which is quickly and easily set up, and the display matter attached to it by a unique fastening means formed by the simple manipulation of hinged panel portions of the frame structure and with no type of adhesive being needed.

Still a further object of this invention is to provide interesting and attractive frames decorated to simulate picture frames or theatre interiors or stages, with all of the decoration or printing being done on one surface of the prepared card blanks.

The foregoing and other objects and advantages of my invention will be more readily apparent from the following description of the embodiments of the invention, illustrated by way of example only by the accompanying sheets of drawings in which:

Fig. 1 is a perspective view of a display frame structure in accordance with one embodiment of this invention in set-up position, with the display matter properly mounted on it behind the opening in the frame;

Fig. 2 is a side elevation of the frame structure and mounted display matter in their rearwardly inclined position;

Fig. 3 is a plan view showing the rearward arc or bow of the mounted display matter;

Fig. 4 is an enlarged perspective view of a portion of the display assembly;

Fig. 5 shows the prepared sheet blank, of which the frame structure portion of the display shown in Figs. 1 to 4 is composed;

Fig. 6 shows a portion of a modified sheet blank, with which to erect a frame structure similar to that of Fig. 1, and comprising a second embodiment of the invention;

Fig. 7 is a perspective view of a display frame structure with its mounted display matter, in accordance with a third embodiment of this invention;

Fig. 8 is a side elevation of the frame structure and mounted display matter of Fig. 7 in the rearwardly inclined position;

Fig. 9 is a perspective view from the rear of the display assembly of Fig. 7;

Fig. 10 is a plan view of the display assembly of Fig. 7;

Fig. 11 shows the prepared sheet blank from which the frame structure portion of the display assembly shown in Figs. 7 to 10 is formed;

Fig. 12 is a perspective view of a display frame structure with its mounted display matter, in accordance with a fourth embodiment of the invention;

Fig. 13 is a sectional view taken on the line 13—13 of Fig. 12;

Fig. 14 is a view from the rear of the display assembly shown in Fig. 12, with a portion of the display matter broken away to show interior structural details;

Fig. 15 is a view from the rear of the same frame structure shown in Figs. 12 to 14, but in a vertically erected position and with a portion of the display matter broken away to show interior structural details;

Fig. 16 shows the prepared sheet blank from which the frame structure and removable brace portions of the display shown in Figs. 12 to 15 are formed;

Fig. 17 is a perspective view of a display frame structure with its mounted display matter, in accordance with a fifth embodiment of the invention;

Fig. 18 is a side elevation of the frame structure and displayed matter shown in Fig. 17 in its rearwardly inclined position;

Fig. 19 is a plan view showing the relation of the display structure to the mounted display matter;

Fig. 20 shows the prepared sheet blank from which the frame structure portion of the display shown in Fig. 17 is prepared; and Fig. 21 is an enlarged sectional view through the right hand portion of the view shown in Fig. 19.

These related types of display frame structures are designed to display picture post cards and art post cards of the standard size now sold in variety stores and art museums, but they may also be made in larger sizes for displaying posters or other advertising material, as for travel agencies or for displaying any other printed matter or photographs that may be printed on or mounted on stiff sheet material. Also the frame openings may be varied in size and shape and the frames may be cut and printed or colored in a variety of ways to suit the matter to be displayed. When any of these display assemblies are placed directly over or under a light so as to be illuminated within, or from behind for silhouette or transparent effects, they present a stikingly beautiful appearance.

Referring now more particularly to the drawings, the frame structure portion of the assembly, shown in Figs. 1 to 4, is constructed of a single blank of sheet material which is cut and scored to provide a frame 1 hingedly joined to side panels 2, an opening 3, hinging score lines 4 and 5, and tab-like extensions 6 and 7 of the said side panels, the tab-like extensions of each panel being cut free of the adjacent side of the frame by the cut edges 8, 9 and 10.

In the form shown in Fig. 5, the hinging score lines 4 and 5 of each panel are arranged along two slightly separated and parallel hinging axes 4–A and 5–A, with the shorter endmost hinging score lines 4 being arranged along the axis 4–A which is nearest the frame opening, while the remainder, the scored lines 5, are arranged along the axis 5–A, which is farther out from the frame opening. The topmost cut edges 8 of the upper tab-like extensions 6 and the lowermost cut edges 8 of the lower tab-like extensions 6 run only to the line of the nearest hinging axis 4-A, while all the remaining horizontal cut edges 9 of the tab-like extensions of each side panel run to the farther hinging axis 5–A. It will be noted that none of the scored hinging lines 4 and 5 extend through the bases of any of the tab-like extensions 6 and 7 of either side panel, this is so that when each side panel is bent forwardly at an angle, its tab-like extensions, projecting beyond its hinging axes, remain in common planar alignment with it to therefore project rearwardly and inwardly to provide the means of mounting the ends of the arced display matter 11 onto the frame structure to form a diorama-like display to be viewed through the proscenium-like opening 3 in the frame structure. Owing to the provision of two hinging axes for each panel, the forward bending of each panel pushes the short scored end portions 4 of its inner hinging axis 4–A to the rearward, past the plane of the frame, pushing with it the adjacent hingedly joined portions of the frame 1, as shown to an exaggerated degree in Fig. 3. There is also a slight compensating forward movement of the outer hinging score lines 5 which is not shown, being negligible. The rearward displacement of the inner hinging axis of each panel forms a means to lock the arced display matter 11 against vertical movement, owing to the abutting of the top and bottom edges of the arced display matter against the cut edges 8 of the rearward warped portions of the frame, as shown in the enlarged view of a portion of the display in Fig. 4. This locking feature is highly effective.

A simplified modification of the invention may be made by eliminating the vertical movement locking feature. This is done by providing only one hinging axis for each side panel of the frame structure, as is shown in Fig. 6, which is a view of a portion of a modified cut and scored card blank that is similar to the card blank of Fig. 5, except for the modification of the hinging score lines of each side panel. As is shown in Fig. 6, each side panel 12 is hingedly attached to the frame panel 13 along the broken scored hinging lines 14, which score lines are arranged along a single hinging axis, and all of the horizontally cut edges 15, of the tab-like extensions 16 of each side panel run to its single hinging axis from its cut end edges 17 of its said tab-like extensions. The forward hinging of the side panels again causes the tab-like extensions to project rearwardly and inwardly to form the attaching means for the arced display matter, this modified frame structure being a second embodiment of the invention. With this modification of the invention, the rearward tilt of the display may be increased or decreased to change the angle of view by raising or lowering the mounted display matter on the back of the frame structure.

The display may be assembled even more permanently if desired by placing a drop of adhesive under each tab where it presses on the rear face of the display matter adjacent its ends. With the modified frame structure of Fig. 6 a single large vertically arranged tab-like extension of each side panel may be provided, instead of two or more smaller ones as described above, or, if desired, either of the above described embodiments of the invention may be provided with a large number of rather small tab-like extensions, of any shape desired, as for example an easily cut arc shaped tab. The openings in the frame from which the tab-like extensions emerge may form a part of the frame's ornamental design, and provide a striking effect when illumination is used.

Referring now to Figs. 7 to 11, another embodiment of the invention is disclosed in which the hinged panels that provide the fastening means are attached inside the frame opening, and again by their simple manipulation produce the tab-like extensions which hold the display matter onto the back of the display structure.

The frame structure portion of the assembly shown in Figs. 7 to 10 is formed of a single blank of sheet material which is cut and scored as shown in Fig. 11 to provide a frame 21 and a frame opening 22 with its vertical sides defined by the score lines 23. Hingedly attached along each of the said score lines 23 is a narrow vertically divided panel 24. The vertical division of each panel is formed by a sectional scored hinging line 25 with a number of unscored gaps in it. From the free side of each divided panel, a number of tab-like extensions 26 project through the said unscored gaps in the sectional hinging line, and into the attached side of the panel, from which they are cut free.

To set up the display according to Fig. 7, the free side of each divided panel 24 is folded sharply backward along the sectionally scored hinging line 25, releasing the cut tab-like extensions 26 from the attached side of the divided panel. The attached side of each divided panel is then folded sharply rearward along the score line 23, causing the tab-like extensions to propect rearwardly and inwardly as shown in Figs. 9 and 10. The display matter 27 is arced and attached in place on the back of the frame structure by inserting its ends under the tab-like extensions 26, completing the diorama like display, which is viewed through the opening in the frame structure, as shown in Fig. 7. It will be noticed that the outward pressure of the arced display matter 27 against the tab-like extensions and the creased panels forces the free edges of the panels against the back of the frame structure, which in turn presses the tab-like extensions firmly against the ends of the display matter, as shown in the rear view Fig. 9, and in the plan view Fig. 10. This forms a surprisingly secure assembly, and may be adjusted to any angle by sliding the display matter up or down in its mounting, as, for example, to stand it almost vertical for viewing at eye level, or to stand at a rearward tilt, as shown in Fig. 8, if placed at below eye level. In Fig. 8 and Fig. 9 the display matter is depicted with the same vertical dimension as the frame opening to better illustrate construction details, but ideally the frame opening is of smaller vertical dimension than the display matter to conceal the top and bottom edges of the display matter. Instead of the arrangement of tab-like extensions shown, each panel may provide a single, vertically broad extension or any number of smaller ones. The broken lines 28 show the relative position in which optional side panels may be located to be folded either rearward for support or forward for decorative use, or to bear advertising.

Referring now to Figs. 12 to 16, another embodiment of the invention is disclosed in which the display matter is amounted on the back of the frame structure in a flat position instead of an arced position, but the fastening means is the same type as that of the previously described embodiment of the invention, and the completed display assembly presents the appearance of display matter framed in a deep set picture frame, although the frame may be ornamented in any manner desired. This frame is especially suitable for displaying art reproduction post cards.

The frame structure portion of the assembly, shown in Figs. 12 to 16, is formed of a single blank of sheet material which is cut and scored as shown in Fig. 16 to provide a frame 31, with long narrow edge panels 32 hingedly attached to the frame along its outer margins, which are defined on the card blank by the scored hinging lines 33, leaving a small removable waste portion 34 at each corner. Within the frame an opening is provided, its margins being defined by the scored lines 35, and hingedly attached along each of the said scored lines is a longitudinally divided panel 36, its slanted ends being defined by and cut free of adjacent panel ends by the 45 degree cut lines 37 and each panel's free swinging side edge being defined by the cuts 38, leaving a removable portion 39 in the center, its function to be explained below. Each of the said panels 36 is divided along its length by a scored sectional hinging line 40, with a number of unscored gaps in it.

From the free side of each divided panel 36 a number of tab-like extensions 41 project through the said unscored gaps in the sectional hinging line 40, and into the attached side of the panel, from which they are cut free.

To set up the display the waste portions 34 and separated and discarded, or, if desired, each one may be used as a gluing tab by separating each corner piece 34 on one of its attached sides and hinging it backward on the remaining side. The long narrow edge panels 32 are folded sharply backward along the score lines 33 and creased, then made to assume a position at right angles to the plane of the frame 31, thereby forming an attractive finished edge to the structure. If the portions 34 have been prepared to use as glue tabs, they are then glued under the end of the adjacent edge panel, or other means may be provided for permanently joining the ends of the narrow edge panels if desired. The center portion 39 is next removed and set aside for later use as the rear support for the frame 31. If desired, when producing the card blank, the portion 39 may remain partly attached to the card blank by means of tiny un-cut spaces in the cut lines 38, making a storeable and mailable blank. Next, the free side of each divided panel 36 is folded sharply backward along its sectionally scored hinging line 40, releasing the cut tab-like extensions 41 from the attached sides of the divided panels. The attached side of each divided panel 36 is then folded sharply backward along the frame opening marginal score line 35, causing the tab-like extensions 41 to project rearwardly and inwardly as shown in Figs. 13 to 15. The display matter 42 is mounted to the back of the frame structure by spreading the long opposed rows of tab-like extensions apart, inserting the long edges of the display matter under them and allowing them to spring in against the back of the edges of the display matter. The spaced end tab-like extensions are then likewise spread and engaged over the ends of the display, thus locking it on all four sides under the tab-like extensions and forward against the hinged sides of the divided panels. This makes a securely assembled display that may be hung onto a wall surface in either a vertical or a horizontal position, by hanging an end of one of the upper middle tab-like extensions 41 over a brad or pin driven into the wall, or holes for hanging may be punched in the free sides of the divided panels. For erecting the display on a horizontal surface, such as a table, the separated easel portion 39 is used to support the display in an erect position, and is so proportioned and designed as to be usable for supporting the display assembly in either a vertically or a horizontally erect position, according to the arrangement of the display matter being exhibited. The attaching tab portions 43 and 44 of the part 39 are cut free of the sides of the divided panels 36 without affecting the appearance or function of the display frame. The part 39 is prepared for use by folding the narrow portion at a right angle to the wide portion, along the scored hinging line 45. To erect the assembly in a horizontal position, the end attaching tabs 44 are inserted under an opposing pair of the tab-like extensions 41 of the long divided panels 36 as shown in Fig. 14, the attaching tabs projecting into the sides of the openings from which the tab-like extensions are cut free, and the narrow portion of the easel pressing against the back of the mounted display matter. The sectional view, Fig. 13, shows how the end attaching tabs 44 slide under and against the rearward projecting tab-like extensions 41 of the divided panel and through the openings from which the tab-like extensions 41 are cut. Also shown is the indented or rearward position of the display matter 42 behind the opening 35 in the frame structure, as well as the desirable rearward tilt of the display. To erect the display in a vertical position, as shown in Fig. 15, the side attaching tabs 43 of the part 39 are inserted under the lower and middle tab-like extensions 41 of one of the long divided panels of the frame structure. The side attaching tabs 43 of the part 39 are cut slightly oversize, and with locking indentations where they join the part 39, so that the said locking tabs may be inserted tightly into the openings from which the tab-like extensions 41 of the divided panels are cut, making a secure attachment of the supporting easel to the back of the frame structure near one side. Should the part 39 be folded in the reverse direction, it would attach to the opposite side of the frame structure. The rearward tilt of the display is necessary for stability, due to its extreme lightness. Obviously the front of the frame structure may be embossed, as well as decorated, to simulate any desired type of picture frame, or other type of display structure. The structure may also be made in larger sizes and would serve to display posters or other advertising matter, large photographs, etc.

Referring now to Figs. 17 to 20, yet another embodiment of this invention is disclosed. In this modification of the frame structure that is shown in Figs. 1 to 6, the side panels or wings again are provided on the frame structure, and their simple manipulation again produces the means by which the arced display matter is mounted onto the frame structure, to form a diorama like display to be viewed through the opening in the frame. The frame structure portion of the assembly, shown in Figs. 17 to 20, is formed of a single blank of sheet material which is cut and scored as shown in Fig. 20 to provide a frame 51, hingedly joined to narrow side panels 52 along hinging score lines 53, an opening 54, and a long narrow slot 55 running most of the vertical length of each narrow side panel 52. To mount the display matter 56 onto the back of the frame structure, the narrow slotted side panels 52 are folded sharply back onto the rear surface of the frame structure, along their hinging score lines 53, and then the display matter is arced, printed surface forward, and its ends inserted into the slots 55 of the side panels, the outward pressure of the arced display matter forcing its ends toward the inside of the hinge creases, as shown in the plan view of Fig. 19, forming a securely locked display assembly to stand at a slight rearward tilt, as shown in Figs. 17 and 18.

To reveal more of the ends of the arced display matter, visible through the frame opening, the sections 57 of the side panels 52, located between the short broken lines 58, may be cut out, the remaining portions of the edges of the side panels will hold the panels in their sharply folded position over the ends of the arced display matter.

If desired, additional wing panels 59 could be located at the sides of the frame structure, and would be hingedly joined to the sides of the narrow side panels 52, as shown by the broken lines 61 in Fig. 20. The said optional wings 59 would be creased forward along hinge lines which would replace the present side edges 62 of the narrow side panels shown in Figs. 17 to 21. The added wings would be folded against the surface of the rearward bent narrow side panels 52, and the slots 60 of the added wing panels 59 would partly overlap the slots of the said narrow side panels, as is shown in Fig. 21 which is a view of a greatly enlarged portion of the complete sectional plan view of Fig. 19. This enlarged portion shown in Fig. 21 makes more clear how the ends of the arced display matter 56 would be inserted through the overlapped slots of each side of the frame structure, so that the forwardly folded optional wing panels would be held in their folded positions due to the pressure of the inside surface of the display matter against the rearward edges of the slots 60 of the optional wing panels. Obviously, the widened structure could still be integrally formed of a single cut and scored sheet blank. The added wings, like the wings of previously described embodiments of the invention could be used for displaying advertising to supplement the displayed matter, or they could be used for decorative effect and could be larger or more elaborately designed.

While I have shown only the preferred form of my invention, I wish to have it understood that various changes or modifications may be made within the scope of the claims hereto attached without departing from the spirit of the invention.

What is claimed is:

1. A display frame structure for displaying cardlike pictures, comprising a panel element constituting a frame having a display opening therethrough, vertically hinged panels at opposite sides of said opening, a tab for holding a card to be exhibited located on each opposite side of said opening but spaced therefrom and cut from said panel element along one edge of said tabs and along the top and bottom of said tabs, the opposite edge of said tabs being continuous with said panel element and with said vertical hinged panels, said tabs being adapted to project rearwardly of said panel element and rearwardly of that hinged panel next adjacent said panel element so that a card may be inserted between the tabs and the adjacent face of said panel element.

2. A display frame structure for displaying cardlike pictures, comprising a panel element constituting a frame having a display opening therethrough, vertically hinged panels at opposite sides of said opening, a plurality of tabs for holding a card to be exhibited located on opposite sides of said opening but spaced therefrom and cut from said panel about their respective peripheries except for an edge which connects each tab to said panel element, that portion of said tabs farthest from said opening being continuous with said panel element and with said vertical hinged panels, said tabs being adapted to project rearwardly from said panel element and rearwardly of that hinged panel next adjacent said panel element so that a card may be inserted between the tabs and the adjacent face of said panel element.

3. A display frame structure for displaying cardlike pictures, comprising a panel element constituting a frame having a multi-sided display opening therethrough, vertical hinged panels at opposite sides of said opening, a plurality of tabs for holding a card to be exhibited located on each side of said opening but spaced therefrom and cut from said panel along that first edge of said tabs next adjacent said opening and along the sides of said tabs leading from said first edge, that portion of said tabs farthest from said opening being continuous with said panel element, said tabs being adapted to project rearwardly of said panel and rearwardly of that hinged panel next adjacent said panel element.

4. A display frame structure for displaying cardlike pictures comprising a panel element constituting a frame having a display opening therethrough, vertical hinged panels at opposite sides of said opening, each of said hinged panels being provided with a fold line vertically intermediate its width dividing each said vertical panel into two vertical portions hinged to each other and one of which vertical portions is hingedly connected to said panel element at the side of the opening, and a tab for holding a card to be exhibited located on each vertically hinged panel and cut from said hinged panels along one edge and along the top and bottom of said tabs, the opposite edge of each tab being continuous with and in the same plane with the vertical portion farthest from the side of said opening, said tabs being adapted to project outwardly from said hinged panels and rearwardly of said panel element, the said opposite edges of said tabs being in alignment with said fold lines, the ends of said tabs and that vertical portion of each panel to which said tabs are attached serving to space the marginal edge of a card to be displayed rearwardly of said panel element and the display opening therein.

5. A display frame structure displaying cardlike pictures comprising a panel element constituting a frame having a display opening therethrough, vertical hinged panels at opposite sides of said opening, each of said hinged panels being provided with a fold line vertically intermediate its width dividing each said vertical panel into two vertical portions hinged to each other and one of which vertical portions is hingedly connected to said panel element at the side of the opening, and a plurality of tabs for holding a card to be exhibited located on each vertical hinged panel and cut from said hinged panels along one edge and along the top and bottom of said tabs, the opposite edge of said tabs being continuous with and in the same plane with the vertical portion farthest from the side of said opening, said tabs being adapted to project outwardly from said hinged panels and rearwardly of said panel element, the said opposite edges of said tabs being in alignment with said fold lines, said panel element and said vertical hinged panels and said tabs being of one continuous piece, the ends of said tabs and that vertical portion of each panel to which said tabs are attached serving to space the marginal edge of a card to be displayed rearwardly of said panel element and the display opening therein.

6. A display frame structure for displaying cardlike pictures comprising a panel element constituting a frame having a display opening therethrough, a set of vertical hinged panels at opposite sides of said opening, each of said hinged panels being provided with a fold line vertically intermediate its width dividing each said hinged panel into two vertical portions hinged to each other and one of which portions of each set of vertical panels is hingedly connected to said panel element at the side of the opening, and a plurality of card retaining tabs on each vertically hinged panel and cut from said hinged panels along one edge and along the top and bottom of said tabs, the fourth edge of said tabs being continuous with and in the same plane with the vertical panel farthest from the side of said opening, said tabs being adapted to project outwardly from said hinged panels and rearwardly of said panel element, the said fourth edges of said tabs being in alignment with said fold lines, and a second set of hinged panels at the top and bottom of said opening, each of said horizontally hinged panels being provided with a fold line horizontally intermediate thereof dividing each said hinged panel into two horizontal portions hinged to each other and one of which portions of each set of horizontal panels is hingedly connected to said panel element at the top of the opening and the other of which portions is hingedly connected to said panel element at the bottom of said opening, and a plurality of card retaining tabs on each horizontally hinged panel and cut from said horizontally hinged panels along the side edges and along a third side of said tabs, the fourth side of said tabs on said horizontally hinged panel being continuous with and in the same plane with the horizontal panel farthest from the side of said opening, said tabs on said horizontally hinged panels being adapted to project outwardly from said horizontally hinged panels and rearwardly of said panel element, the fourth edge of said tabs on said horizontally hinged panels being in alignment with said fold lines in said second set of horizontally hinged panels and parallel to said panel element.

7. A display frame structure for displaying cardlike pictures comprising a panel element constituting a frame having a display opening therethrough, a set of vertical hinged panels at opposite sides of said opening, each of said hinged panels being provided with a fold line vertically intermediate its width dividing each said hinged panel into two vertical portions hinged to each other and one of which portions is hingedly connected to said panel element at the side of the opening, and a plurality of card retaining tabs on each vertically hinged panel and cut from said hinged panels along one edge and along the top and bottom of said tabs, the remaining edge of said tabs being continuous with and in the same plane with the vertical panel farthest from the side of said opening, said tabs being adapted to project outwardly from said hinged panels and rearwardly of said panel element, the said remaining edges of said tabs being in alignment with said fold lines, and a second set of hinged panels at the top and bottom of said opening, each of said horizontally hinged panels being provided with a fold line horizontally intermediate thereof dividing each said hinged panel into two horizontal portions hinged to each other and one of which portions of each set of horizontal panels is hingedly connected to said panel element at the top of the opening and the other of which portions is hingedly connected to said panel element at the bottom of said opening, and a plurality of card retaining tabs on each horizontally hinged panel and cut from said horizontally hinged panels along the side edges and along a third side of said tabs, the remaining side of said tabs on said horizontally hinged panel being continuous with and in the same plane with the horizontal panel farthest from the side of said opening, said tabs on said horizontally hinged panels being adapted to project outwardly from said horizontally hinged panels and rearwardly of said panel element, the fourth edge of said tabs on said horizontally hinged panels being in alignment with said fold lines in said second set of horizontally hinged panels, all of said hinged panels and all of said tabs being of one continuous piece with said panel element, and said tabs lying in the same plane with that hinged panel to which it is connected and which hinged panel is farthest from said opening and parallel to said panel element.

8. A display frame structure for displaying cardlike pictures comprising a panel element constituting a frame having a display opening therethrough, vertical panels at opposite sides of said opening, each having one edge hingedly mounted on said panel element laterally from the edge of said opening, a plurality of tabs for holding a card to be exhibited located on said vertical panels and cut from said vertical panels along one edge of said tabs and along the top and bottom of said tabs, the opposite edge of said tabs being continuous with said vertical panels, said tabs being adapted to project rearwardly of said vertical panel and rearwardly of said panel element so that a card may be inserted between the tabs so as to extend across said display opening and be visible therethrough from that side of said panel element opposite to the location of said tabs the ends of said tabs and that vertical portion of each panel to which said tabs are attached serving to space the marginal edge of a card to be displayed rearwardly of said panel element and the display opening therein.

9. A display frame structure for displaying cardlike pictures, comprising a panel element constituting a frame having a display opening therethrough, a hinged panel at either side of said panel element and hinged to said panel element, a plurality of tabs carried by said hinged panels for holding a card to be exhibited and located on opposite sides of said opening but spaced therefrom and cut from said panel element along one edge of said tabs and along the top and bottom of said tabs, the opposite edge of said tabs being continuous with said hinged panels, said tabs being adapted to project rearwardly of said panel element and rearwardly of said hinged panels so that a card may be inserted between the tabs and the adjacent face of said panel element the ends of said tabs and that vertical portion of each panel to which said tabs are attached serving to space the marginal edge of a card to be displayed rearwardly of said panel element and the display opening therein.

10. A display frame structure for displaying cardlike pictures, comprising a panel element constituting a frame having a display opening therethrough, a hinged panel at either side of said panel element and hinged to said panel element, a plurality of tabs carried by said hinged panels for holding a card to be exhibited and located on opposite sides of said opening but spaced therefrom and cut from said panel element along one edge of said tabs and along the top and bottom of said tabs, the opposite edge of said tabs being continuous with said hinged panels, said tabs being adapted to project rearwardly of said panel element and rearwardly of said hinged panels so that a card may be inserted between the tabs and the adjacent face of said panel element, said tabs having a tendency to remain in alignment with said hinged panels when serving to hold a card between the tabs and the adjacent face of said panel element.

11. A display frame structure for displaying cardlike pictures, comprising a panel element constituting a frame having a display opening therethrough, a hinged panel at either side of said panel element and hinged to said panel element, a plurality of tabs carried by said hinged panels for holding a card to be exhibited and located on opposite sides of said opening but spaced therefrom and cut from said panel element along one edge of said tabs and along the top and bottom of said tabs, the opposite edge of said tabs being continuous with said hinged panels, said tabs being adapted to project rearwardly of said panel element and rearwardly of said hinged panels so that a card may be inserted between the tabs and the adjacent face of said panel element, said panel element and said hinged panels and said tabs being of one continuous sheet and of a material common to all of said parts.

References Cited in the file of this patent

UNITED STATES PATENTS

| | | |
|---|---|---|
| 1,432,404 | Macorquodale | Oct. 17, 1922 |
| 1,576,636 | Egan | Mar. 16, 1926 |
| 2,160,724 | Fletcher | May 30, 1939 |
| 2,428,772 | Aranoff | Oct. 14, 1947 |

FOREIGN PATENTS

| | | |
|---|---|---|
| 281,854 | Great Britain | Dec. 15, 1927 |
| 120,162 | Austria | Dec. 10, 1930 |